US006819568B2

United States Patent
Cao

(10) Patent No.: US 6,819,568 B2
(45) Date of Patent: Nov. 16, 2004

(54) PLUGGABLE OPTICAL TRANSCEIVER WITH PIVOTING RELEASE ACTUATOR

(75) Inventor: Chi Hung Cao, North Hollywood, CA (US)

(73) Assignee: Optical Communication Products, Inc., Woodland Hills, CA (US)

(*) Notice: Subject to any disclaimer, the term of this patent is extended or adjusted under 35 U.S.C. 154(b) by 27 days.

(21) Appl. No.: 10/249,232

(22) Filed: Mar. 25, 2003

(65) Prior Publication Data

US 2003/0198025 A1 Oct. 23, 2003

Related U.S. Application Data

(60) Provisional application No. 60/373,158, filed on Apr. 17, 2002.

(51) Int. Cl.[7] .............................. H05K 7/12; H05K 5/02
(52) U.S. Cl. ....................... 361/728; 361/730; 361/752; 361/754
(58) Field of Search ............................... 361/728, 729, 361/730, 731, 752, 754, 740, 741, 801; 174/50; 455/349

(56) References Cited

U.S. PATENT DOCUMENTS

| | | | | |
|---|---|---|---|---|
| 6,229,708 B1 | * | 5/2001 | Corbin et al. | 361/728 |
| 6,430,053 B1 | * | 8/2002 | Peterson et al. | 361/728 |
| 6,434,015 B1 | * | 8/2002 | Hwang | 361/754 |
| 6,556,445 B2 | * | 4/2003 | Medina | 361/728 |
| 6,556,446 B1 | * | 4/2003 | Hwang | 361/728 |
| 6,570,768 B2 | * | 5/2003 | Medina | 361/747 |
| 6,612,858 B1 | * | 9/2003 | Stockhaus | 439/352 |
| 2002/0093796 A1 | | 7/2002 | Medina | |
| 2002/0114141 A1 | | 8/2002 | Medina | |

* cited by examiner

Primary Examiner—David Martin
Assistant Examiner—Dameon E. Levi
(74) Attorney, Agent, or Firm—Barlow, Josephs & Holmes, Ltd.

(57) ABSTRACT

A pluggable optical transceiver having a pivotable actuator assembly for quickly and easily removing the transceiver from a receptacle cage assembly is provided. The actuator assembly includes a slide member, actuator means, and spring means. The rotation of the actuator causes the transceiver to become disengaged from the receptacle. In this manner, the transceiver is released and can be removed easily from the receptacle.

12 Claims, 11 Drawing Sheets

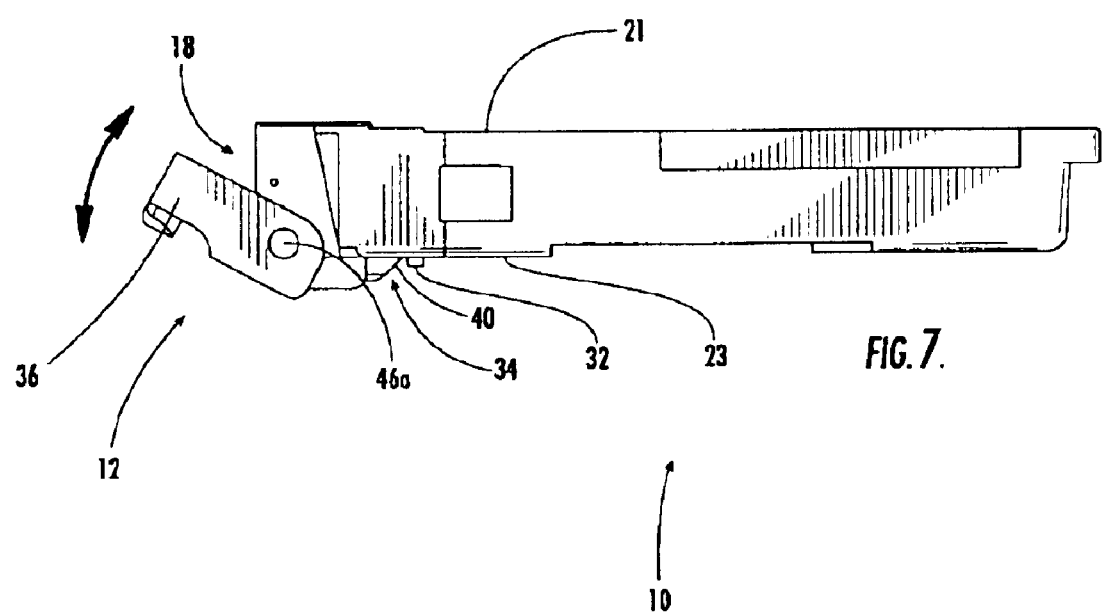

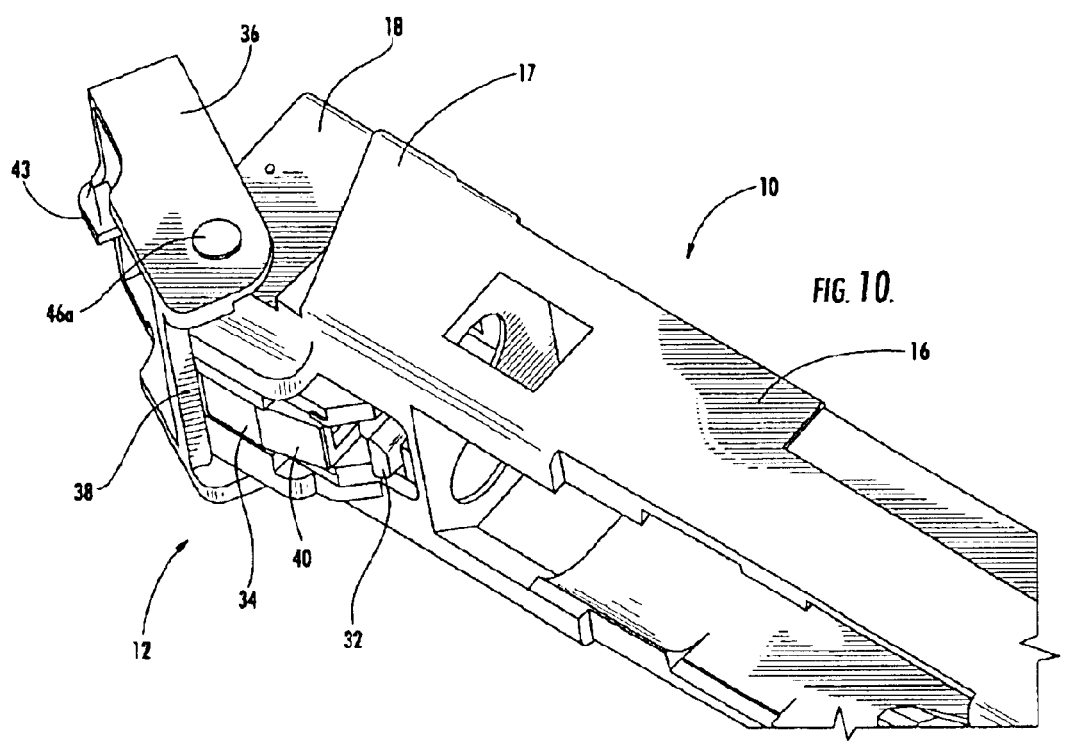

PLUGGABLE OPTICAL TRANSCEIVER WITH PIVOTING RELEASE ACTUATOR

CROSS REFERENCE TO RELATED APPLICATIONS

This application claims the benefit of U.S. Provisional Application No. 60/373,158 having a filing date of Apr. 17, 2002.

BACKGROUND OF INVENTION

The instant invention relates to pluggable optical transceivers, and more particularly to a pivoting release actuator for quickly and easily removing a small form factor pluggable (SFP) transceiver from a transceiver receptacle cage assembly.

Pluggable optical transceivers are known in the art, and have been the subject of various industry standards and sourcing agreements. In particular, multiple vendors have entered into a multi-source agreement (MSA) setting forth common standards and specifications for small form factor pluggable (SFP) transceivers. By way of review, an optical transceiver is an integrated fiber optic component including an optical transmitter and an optical receiver. The pluggable transceiver includes a first end with a fiber optic connector, and a second end with an electrical connector. For the SFP transceiver, the fiber optical connector is a LC-type duplex connector. The electrical connector is a card edge connector that is received into a female electrical connector housed inside a receptacle. The receptacle assembly is mounted on a daughter card of a host system. A common mechanical and electrical outline for the SFP transceiver is defined by the MSA. However, each individual manufacturer (vendor) is responsible for its own development and manufacturing of the SFP transceiver as well as developing a method for releasing the transceiver from the receptacle assembly.

The MSA provides some specifications for securing the transceiver to the receptacle cage. Particularly, the MSA specifies a spring-loaded latching tab in the receptacle that engages a standard locking detent on the bottom surface of the transceiver. When the transceiver is slidably inserted into the receptacle, the detent engages the latching tab and the transceiver is physically retained in place by the interlocking engagement of the detent to the latching tab.

Turning to the subject of the present invention, the MSA does not provide any standard mechanisms for releasing and removing the transceiver from the receptacle cage. In this regard, the instant invention provides a novel actuator assembly for disengaging the latching tab from the detent, thus allowing a person to easily remove the transceiver from the receptacle.

SUMMARY OF INVENTION

More specifically, the actuator assembly of the present invention comprises three separate components. The first component is a slide member slidably mounted on the bottom surface of the transceiver. The slide member is located adjacent to the locking detent on the transceiver.

In addition, the actuator assembly further comprises an actuator pivotably mounted at the front end of the transceiver adjacent to the bottom surface of the transceiver. The actuator includes a cam-shaped cross-bar. Initially, the transceiver is locked in the receptacle cage, and the actuator is in a closed position. Downward and forward rotation of the actuator causes the cross-bar to engage the forward end of the slide member. The cross-bar pushes the slide in a linear direction rearwardly towards the latching tab in the receptacle cage. The slide member has angled cam-surfaces that engage the latching tab and cause the tab to become disengaged from the locking detent. In this manner, the transceiver is released from the receptacle cage. After the transceiver is released, kick-out springs in the receptacle cage automatically force the transceiver to slide forward. The user can then pull the transceiver out of the receptacle easily.

The actuator assembly further comprises a spring captured within a channel in the slide member. When the actuator is rotated downwards to unlock the transceiver from the receptacle cage, the spring is compressed. When the user releases the actuator, the spring forces the slide member to spring back to its initial, forward position, and the actuator to rotate back to its initial, closed position.

Among the objects of the instant invention are: providing an optical transceiver module having an integrated actuator assembly; providing an actuator assembly that can pivot and rotate from a closed position to an open position; providing an actuator assembly having a slide member that can engage a latching tab in a receptacle cage to unlock a transceiver module from the cage; providing an actuator assembly, wherein the profile of the assembly is substantially within the defined dimensions of the transceiver module; and providing an actuator assembly having a spring biased self-return feature.

Other objects, features, and advantages of the invention shall become apparent as the description thereof proceeds when considered in connection with the accompanying illustrative drawings.

BRIEF DESCRIPTION OF DRAWINGS

In the drawings which illustrate the best mode presently contemplated for carrying out the present invention:

FIG. 7 is a side view of the transceiver module showing the actuator in a partially rotated position;

FIG. 10 is a bottom perspective view of the transceiver module in FIG. 7 shown from a different angle than FIG. 8.

DETAILED DESCRIPTION

Figure 1:
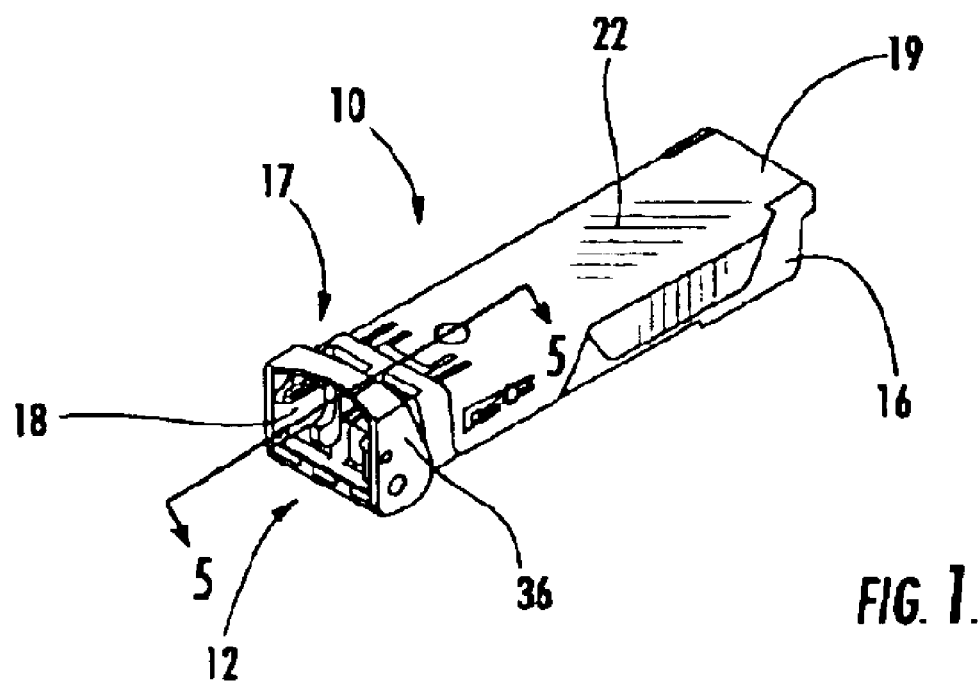
FIG. 1 is a perspective top view of a transceiver module including an actuator assembly in accordance with the present invention.

Referring now to the drawings, the pluggable optical transceiver module of the instant invention is illustrated and generally indicated at 10 in FIGS. 1-10. As will be hereinafter more fully described, the instant pluggable transceiver module 10 includes an integrated actuator assembly generally indicated at 12 for disengaging the transceiver 10 from a corresponding receptacle cage generally indicated at 14 (See FIG. 3).

Figure 2:
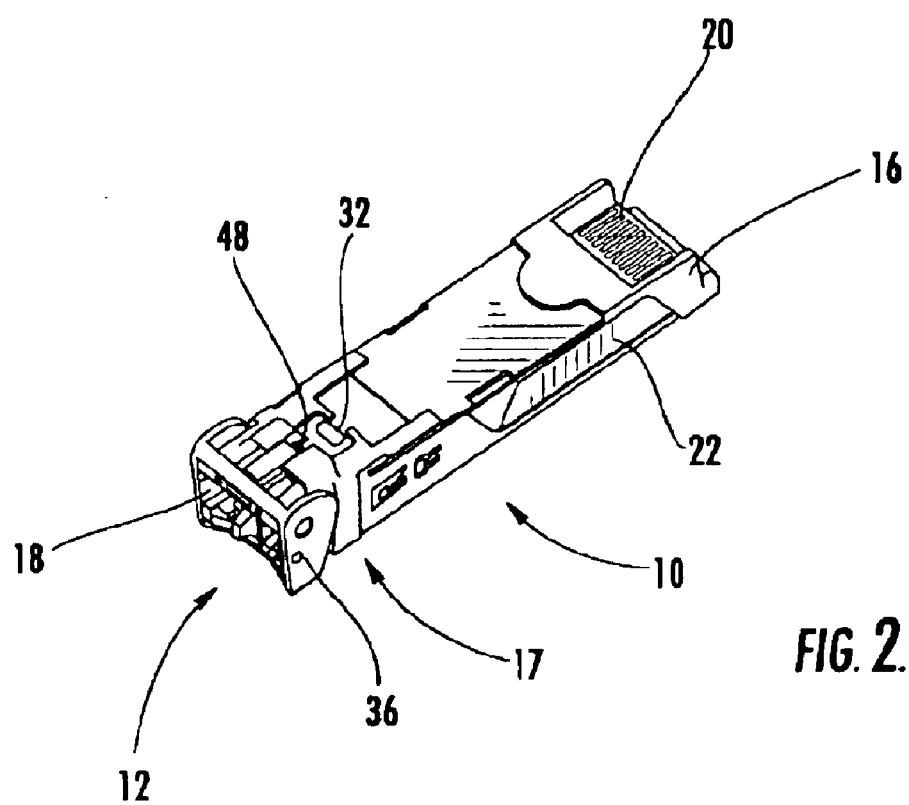
FIG. 2 is a perspective bottom view of the transceiver module shown in FIG. 1.

Generally speaking, the optical transceiver 10 is an integrated fiber optic component including an optical transmitter (not shown) and an optical receiver (not shown). As shown in FIGS. 1 and 2, the pluggable transceiver 10 includes a plastic housing frame 16 having a first side end 17 with fiber optic connector ports 18 formed therein, and an opposite second side end 19 with an electrical edge connector 20 projecting therefrom. For the SFP transceiver 10, the fiber optic connector ports 18 are an LC-type duplex connector.

Figure 8A:
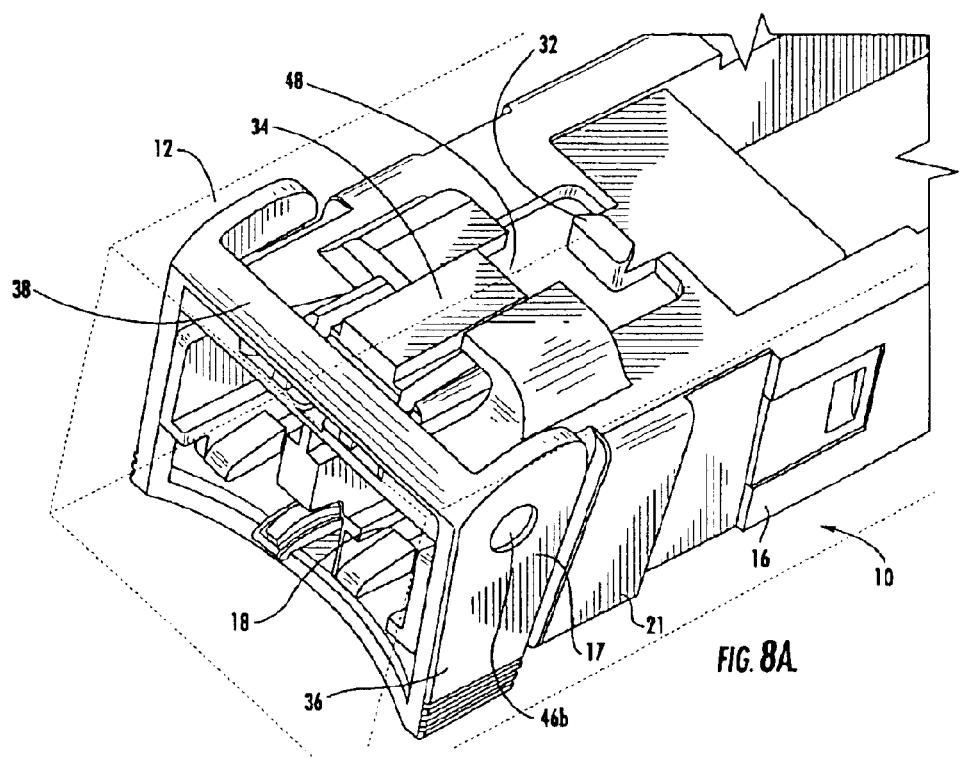
FIG. 8A is a bottom perspective view of the transceiver module in FIG. 7 shown with the actuator in a latched state.
Figure 8B:
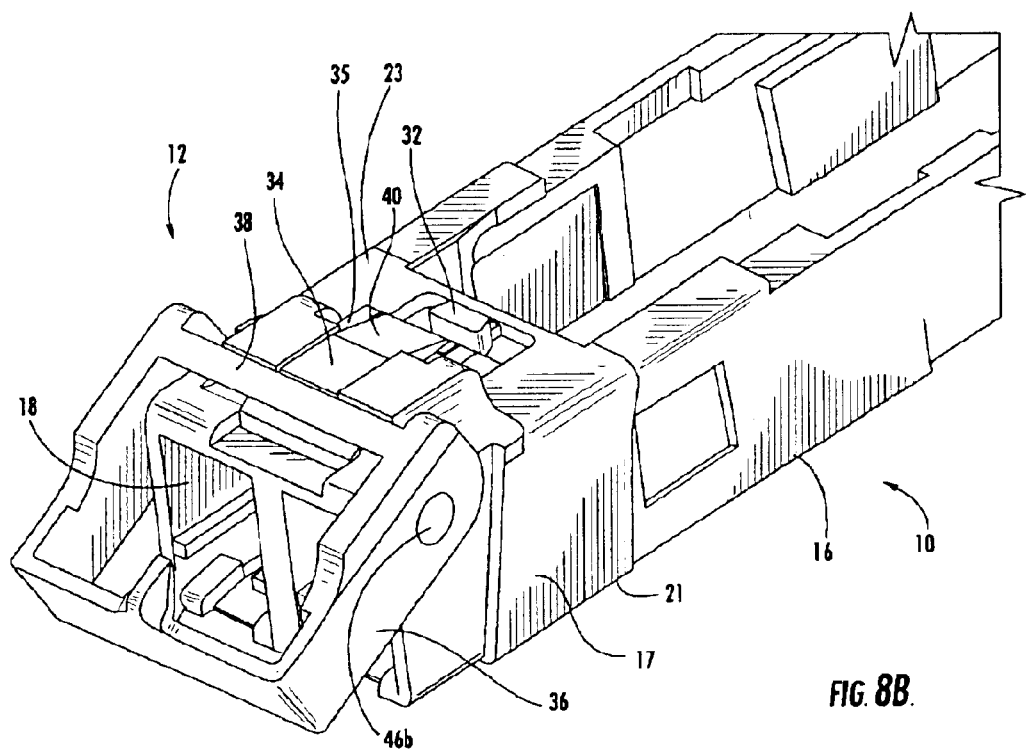
FIG. 8B is another bottom perspective view of the transceiver module in FIG. 7 shown with the actuator in a partially rotated position.

Referring to FIGS. 7 and 8, the housing 16 of the transceiver 10 also includes an upper (top) surface 21 and lower (bottom) surface 23. The lower surface 23 of the housing 16 includes a slide member 34 and a locking detent 32. The locking detent 32 secures the transceiver 10 in the receptacle cage 14 as described in further detail below. More specifically, the slide member 34 and locking detent 32 are mounted in a channel 35 that extends longitudinally along at least a portion of the lower surface 23 of the transceiver 10. The locking detent 32 is located at the rear of the longitudinal channel 35 adjacent to the slide member 34.

Referring back to FIGS. 1 and 2, the optical transmitter and receiver are mounted on a circuit board that is received inside the housing frame 16 of the transceiver 10. The rear edge of the circuit board forms the electrical edge connector 20 that protrudes from the open side end 19 of the housing frame 16. A metallic cover 22 encloses the top portion of the frame 16 and provides electromagnetic interference (EMI) shielding and case grounding to the chassis ground. The first end 17 of the housing 16 serves as a fiber optic interface to a standard LC-type duplex fiber optic cable (not shown). The outer dimensions of the male plug end of the LC-type duplex fiber optic cable are standard, and therefore the corresponding female fiber optic connector ports must also be standard dimensions. The first end 17 of the housing frame 16 is generally rectangular, slightly longer side-to-side, when viewed from the front. The width and height of the housing frame 16 are fixed by SFP standards. The two connector ports 18 are symmetrically positioned and arranged within the rectangular outline. Latching surfaces are provided within the connector ports 18 to permit engagement with the standard latch members of the fiber optic cable. The arrangement of the actuator assembly 12 around the outside surface of the first end 17 of the transceiver 10 is further described below.

Figure 3:
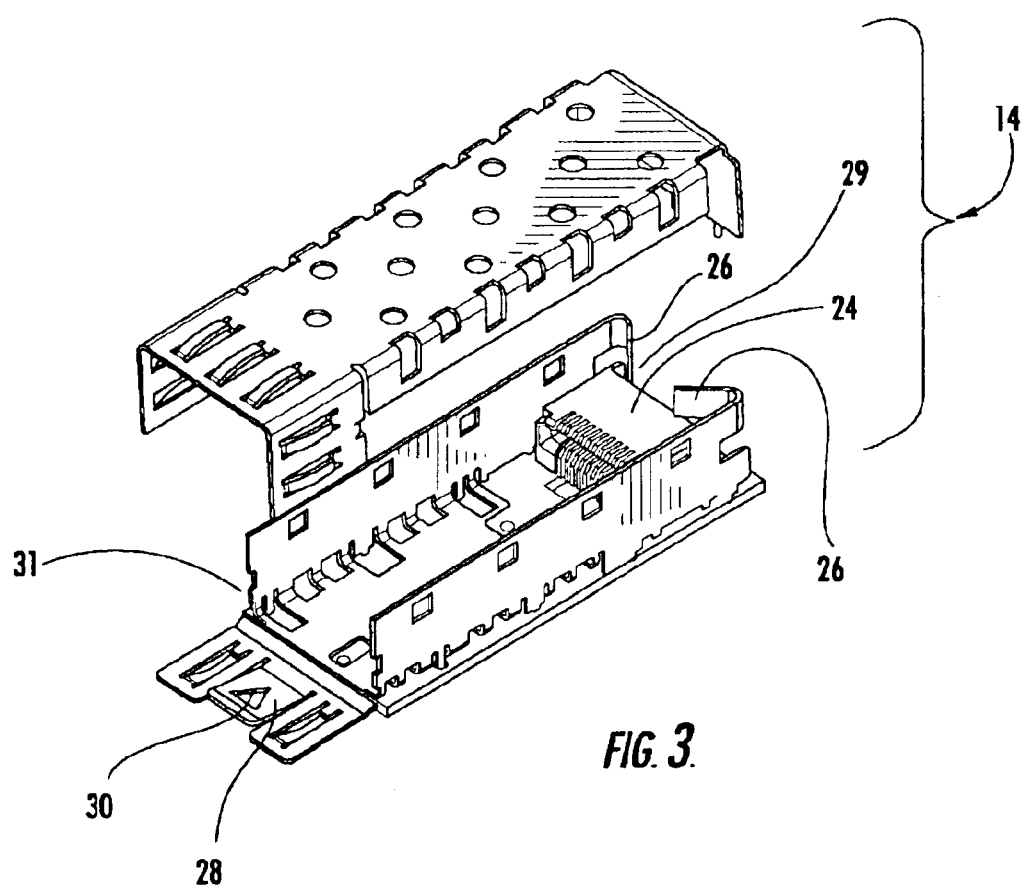
FIG. 3 is a perspective view of a two-part receptacle cage assembly in accordance with the present invention.

As shown in FIG. 3, the electrical edge connector 20 is received into a female electrical connector 24 housed inside the receptacle cage 14 which is in turn mounted on a daughter card of a host system (not shown). The receptacle cage 14 includes a pair of kick-out springs 26 located at the rear end 29 of the cage 14 which engage the rear end of the transceiver 10 and bias the transceiver outwardly. A spring-loaded latching tab 28 is located at the open forward end 31 of the receptacle cage 14. The latching tab 28 includes an opening or aperture 30 therein for locking the detent 32 of the transceiver 10.

During insertion of the transceiver module 10 into the receptacle cage 14, the transceiver 10 slides into the receptacle 14 and the locking detent 32 catches and interlocks with opening 30 in the latching tab 28. The transceiver 10 is secured to the receptacle 14 by means of detent 32 engaging and entering the opening 30 in the latching tab 28. The interlocking engagement of detent 32 and opening 30 locks the transceiver 10 within the receptacle 14. Basically, a person can insert the transceiver module 10 into the receptacle cage 14 by pushing the transceiver 10 into the cage 14 until he or she feels the resistance of the kick-out springs 26 located at the rear of the cage 14. Then, the person should push the transceiver 10 further until feeling the "click" of the detent 32 locking with the opening 30.

In order to release and remove the transceiver module 10 from the receptacle cage 14, the transceiver 10 of the instant invention includes an actuator assembly 12. More specifically, the actuator assembly 12 comprises three separate components.

Figure 9:
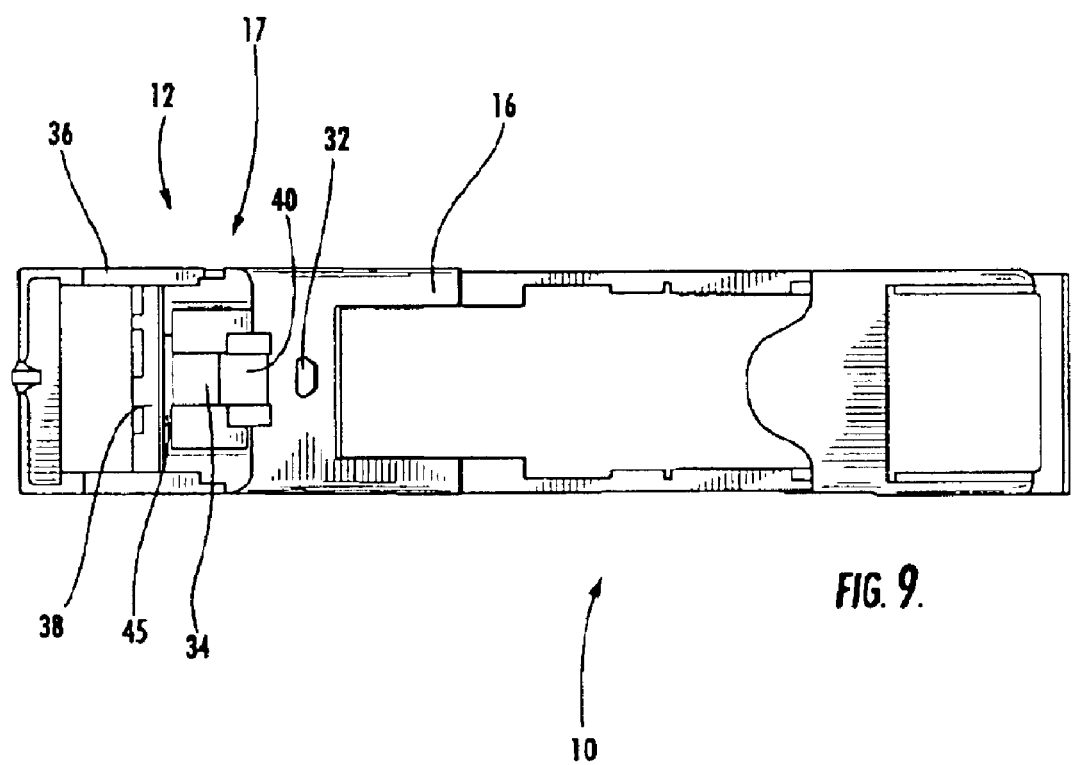
FIG. 9 is a bottom view of the transceiver module in FIG. 7 shown from a different angle than FIG. 8.

Referring to FIGS. 8 and 9, the first component is a slide member 34 slidably mounted in the channel 35 that extends along the lower surface 23 of the housing frame 16. The slide member 34 is located adjacent to the locking detent 32. The slide member is captured within the channel 35 by overextending abutments 45. The side surfaces of the slide member 34 are slotted to provide snap mounting of the slide 34 within the channel 35.

Figure 4:
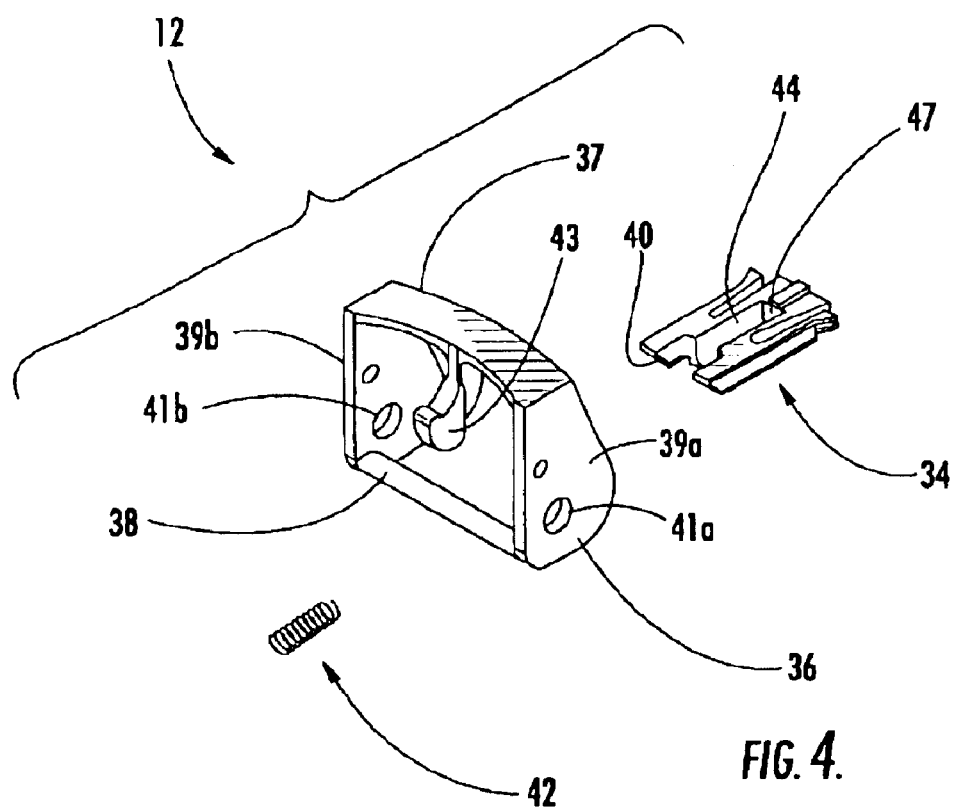
FIG. 4 is an exploded perspective view of the actuator assembly of the present invention including the slide, actuator and spring.

As illustrated in FIG. 4, the actuator assembly 12 further comprises an actuator 36 pivotably mounted at the front end 17 of the transceiver frame 16. More specifically, the actuator 36 is generally a "U-shaped" structure having a horizontal leg 37, and two vertical arms 39a and 39b depending downwardly therefrom. The outside surface of the first end 17 of the transceiver housing frame 16 includes a shoulder portion having a reduced thickness so that the outside surfaces of the actuator arms 39a and 39b remain flush with the outside surface of the housing 16. This accommodation maintains the entire transceiver package within generally accepted SFP outer dimensional specifications. The actuator 36 further includes a cam-shaped cross-bar 38 extending horizontally across the opening of the U-shaped actuator 36. Particularly, the cross-bar 38 extends from a lower portion of arm 39a to arm 39b.

In order that the actuator 36 can pivot, the arms 39a and 39b include pivot openings 41a and 41b at their lower ends which are snap-received onto complementary pivot bosses 46a and 46b protruding from the side surface of the transceiver housing frame 16. In this manner, the actuator 36 can pivot adjacent to the lower surface 23 of the frame 16 so that downward and forward rotation of the actuator 36 causes the cross-bar 38 on the actuator to move towards and engage the forward end of the slide member 34. The cross-bar 38 is shown from different angles in FIGS. 7-10 as it rotates and engages the slide member 34.

Figure 5:
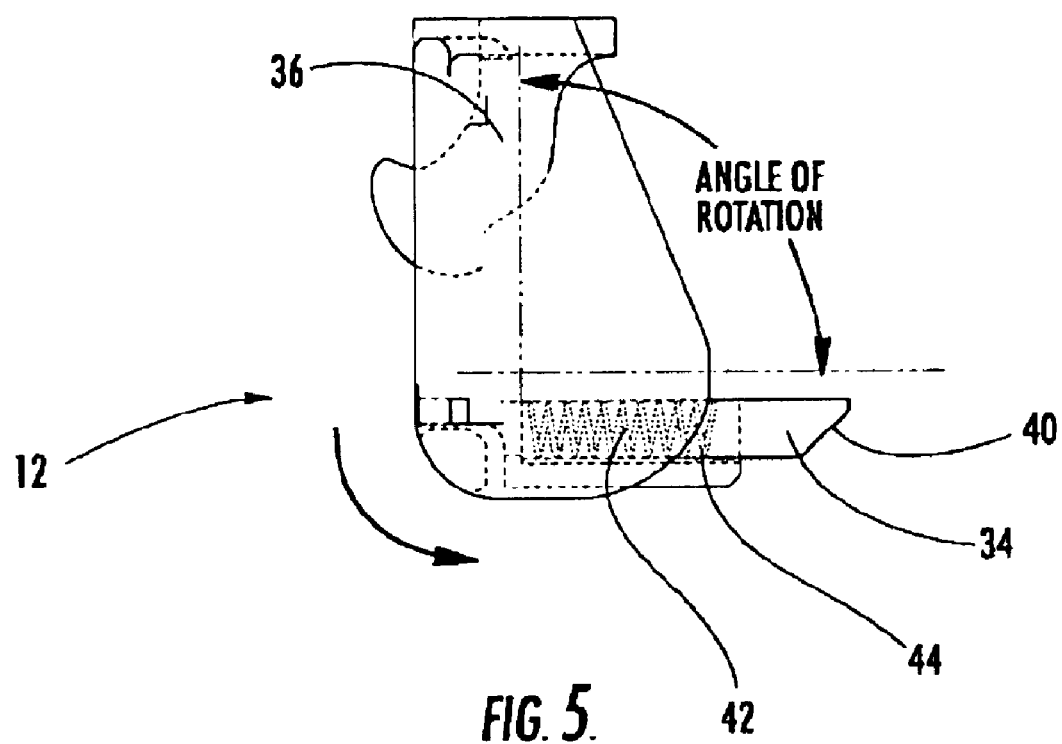
FIG. 5 is a cross-sectional view of the actuator assembly as taken along line 5—5 of FIG. 1.
Figure 6:
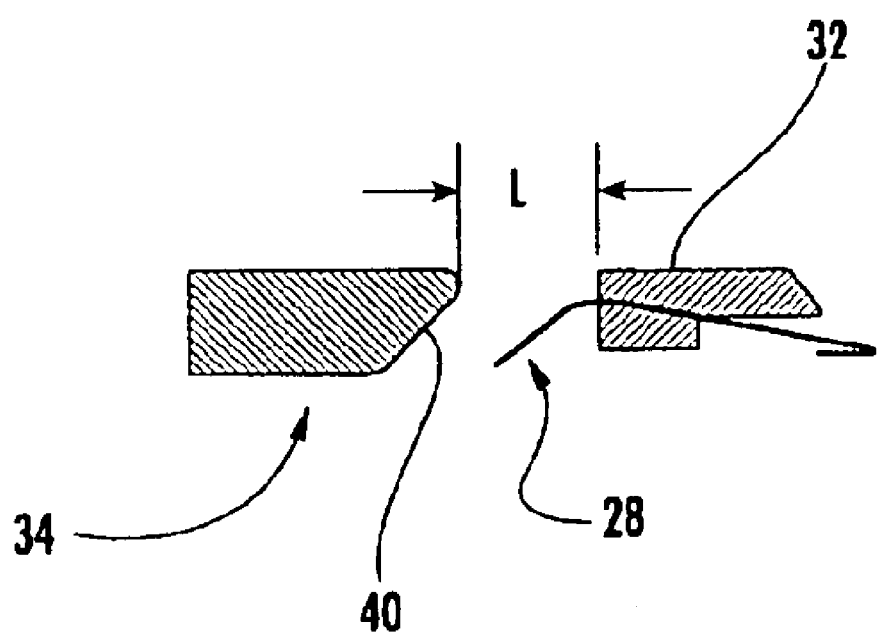
FIG. 6 is a schematic view showing engagement of the angled cam-surface of the slide member with the latching tab of the receptacle cage.

Referring to FIGS. 5 and 6, the cross-bar 38 acts as a cam and pushes the slide member 34 in a linear direction (x) rearwardly within channel 35 and towards the latching tab 28 in the receptacle cage 14. The slide member 34 has an angled cam-surface 40 at its rear end that engages the surface of latching tab 28 (see broken lines in FIG. 6), thereby causing the locking detent 32 to become separated from the opening 30 and releasing the transceiver 10 from the receptacle cage 14. With the locking detent 32 and latching tab 28 disengaged, the kick-out springs 26 automatically force the transceiver 10 to spring outwardly. The user can then simply pull forwardly on the actuator handle 36, and the transceiver 10 will slide out of the receptacle cage 14.

In some instances, the transceiver 10 can be tightly and densely packed in the receptacle cage 14, and a person may not have easy access to the actuator 36. Particularly, a person may not be able to grasp the inner edge of the horizontal leg 37 of the actuator 36 to initiate removal of the transceiver 10 from the receptacle 14. To address this problem, the horizontal leg 37 of the actuator 36 can include a finger tab 43 that arcs slightly forwardly as shown in FIG. 4. The finger tab 43 provides easy access to the actuator 36. A person can use his or her fingers to pull on the finger tab 43 in a slightly downward and forward direction and begin rotation of the actuator 36. Subsequently, the rotation of the actuator 36 can be completed by a person grasping and pulling directly on the horizontal arm 37. More particularly, the direction and angle of rotation of the actuator 36 is illustrated in FIG. 5.

As shown in FIGS. 4 and 5, the actuator assembly 12 further comprises a spring 42 captured within a channel 44 in the slide member 34. An end wall 47 in the channel 44 captures one end of the spring 42, and a shoulder tab 48 protruding from the bottom surface of the channel captures the other end of the spring 42. Initially, the transceiver 10 is locked in the receptacle cage 14 with the actuator 36 is in a closed, locked position and the slide member 34 is in a forward resting position. When a person initiates rotation of the actuator 36 and causes the cross-bar 38 to make contact with the slide member 34, the spring 42 is compressed. The slide member 34 moves in a rearward direction and engages the latching tab 28 on the receptacle cage 14, thereby releasing the transceiver 10 from the cage 14. Subsequently, when the person releases the actuator 36, the spring 42 expands forcing the slide member 34 to spring back to its original forward position and the actuator 36 to rotate back to its original closed position.

While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A pluggable optical transceiver module, comprising:
    a housing having a first side end, an opposing second side end, an upper surface, and a lower surface, said lower surface having a locking detent projecting therefrom for engaging an opening in a latching tab located in a receptacle cage; and
    an actuator assembly comprising:
        (i) an actuator pivotably attached to one end of the housing, wherein force exerted on the actuator causes the actuator to pivot,
        (ii) a slide member adapted to slide towards and engage the latching tab in the receptacle as the actuator pivots, thereby causing the detent to become disengaged from the opening and releasing the transceiver from the receptacle, and
        (iii) a spring biasing means for urging the slide member towards the latching tab.

2. The transceiver module of claim 1, wherein the first end of the housing has a pair of fiber optic connector ports located therein and the second end of the housing has an electrical edge connector projecting therefrom.

3. The transceiver module of claim 1, wherein a metallic cover encloses the upper surface of the housing.

4. The transceiver module of claim 1, wherein the actuator has a U-shaped structure comprising a horizontal leg and two vertical arms depending downwardly therefrom.

5. The transceiver module of claim 4, wherein the U-shaped actuator includes a cam-shaped cross-bar extending from one vertical arm to the other vertical arm.

6. The transceiver module of claim 1, wherein the actuator further comprises a finger tab for finger-pulling the actuator.

7. The transceiver module of claim 1, wherein the actuator rotates in a downward direction to release the transceiver from the receptacle.

8. The transceiver module of claim 1, wherein the slide member has an angled surface for engaging the latching tab.

9. The transceiver module of claim 1, wherein the slide member is disposed in a channel extending along the lower surface of the transceiver housing.

10. A pluggable optical transceiver and receptacle package assembly, comprising:
    a receptacle cage for receiving the transceiver, said cage having a first side end and an opposing second side end, wherein the first side end has a latching tab containing an opening therein; and
    a transceiver comprising a housing with a first side end, an opposing second side end, an upper surface, and a lower surface, said lower surface having a locking detent projecting therefrom for engaging the opening in the latching tab of the receptacle; and an actuator assembly, said actuator assembly comprising:
        (i) an actuator pivotably attached to one end of the housing, wherein force exerted on the actuator causes the actuator to pivot,
        (ii) a slide member adapted to slide towards and engage the latching tab as the actuator pivots, thereby causing the detent to become disengaged from the opening and releasing the transceiver from the receptacle, and
        (iii) a spring biasing means for urging the slide member towards the latching tab.

11. The transceiver and receptacle package assembly of claim 10, wherein the second side end of the receptacle has a pair of kick-out springs for releasing the transceiver.

12. The transceiver and receptacle package assembly of claim 10, wherein the assembly is mounted on a circuit board.

* * * * *